to dryness. The remaining residue is chromatographed on silica gel and there is obtained 3.1 g. 21-fluoro-1,2α-methylene-delta[4,6]-pregnadiene-17α-ol-3,20-dione with a melting point of 231 to 236° C. UV: epsilon–282=20,100.

(b) This product is subsequently esterified in to the 17-position.

(c) 5.0 g. 21-fluoro-1,2α - methylene-delta[4,6]-pregnadiene-17α-ol-3,20-dione-17-acylate in 250 ml. dioxane are reacted with 5.0 g. N-bromine-succinide, 50 ml. water and 5 ml. 70% perchloric acid under stirring. After a reaction time of 75 minutes at room temperature, the reaction solution is mixed with sodium sulfite-containing water, the precipitate is sucked off, washed with water and dried. The 21-fluoro-7α-bromo-1,2α-methylene-delta[4]-pregnene-6-beta-17α-diol-3,20-dione-17-acylate thus obtained is dissolved in 40 ml. methanol, mixed with a solution of 2.5 g. potassium carbonate in 4 ml. water and heated for 1 hour under reflux. Then the reaction solution is neutralized with acetic acid and concentrated greatly in the vacuum. After ice water precipitation, the precipitate is filtered, washed and dried. There are obtained about 2.5 g. 21-fluoro-6,7-beta-oxide-1,2α-methylene-delta[4]-pregneno-17α-ol-3,20-dione-17-acylate.

(d) 21-fluoro-6,7α-oxide-1,2α - methtylene-delta[4]-pregnene-17α-ol-3,20-dione-17-acylate.

10 g. 21-fluoro-1,2α-methylene-delta[4,6]-pregnadiene-17α-ol-3,20-dione-17-acylate are dissolved in 60 ml. ethylene chloride and mixed under stirring with a solution of 12 g. m-chloroperbenzoic acid in 35 ml. ether. The reaction mixture is left standing for 5 days at room temperature, diluted with methylene chloride and the organic phase is washed successively with a weak iron (II)-sulfate solution, diluted sodium hydrogen carbonate solution and water. After drying and evaporation in the vacuum, there results about 9 g. 21-fluoro-6,7α-oxido-1,2α-methylene - delta[4]-pregnene - -7α-ol-3,20-dione-17-acylate.

EXAMPLE 1

Compound: I-17-acetate 700 mg. (I) are stirred in 15 ml. glacial acetic anhydride with 350 mg. p-toluene-sulfonic acid for 17 hours at room temperature. The product is then stirred into ice water-pyridine, the precipitate sucked off, taken up in methylene chloride and washed with dilute hydrochloric acid, sodium hydrogen carbonate solution and water. After drying over sodium sulfate and evaporation to dryness, the product is recrystallized from acetic ester, and there is obtained 605 mg. (I)-17-acetate with a melting point of 193 to 194.5° C. UV: epsilon–282=17,100.

EXAMPLE 2

Compound: (I)-17-propionate 100 mg. (I) were stirred in 1 ml. propionic anhydride with 50 mg. p-toluene-sulfonic acid for 3 days at 37° C. After subsequent steam distillation and ether extraction, the organic phase is dried over sodium sulfate and evaporated to dryness. The residue is recrystallized from isopropyl ether and there is obtained 81 mg. (I)-17-propionate with a melting point of 170–172° C. UV: epsilon–282=17,000.

EXAMPLE 3

Compound: (I)-17-butyrate 100 mg. (I) are stirred in 1 ml. butyric anhydride with 50 mg. p-toluene-sulfonic acid for 3 days at 37° C. After subsequent steam distillation and ether extraction, the organic phase is dried over sodium sulfate and evaporated to dryness. The residue is recrystallized from isopropyl ether and there is obtained 81 mg. (I)–17-butyrate with a melting point of 173–174° C. UV: epsilon–282=17,000.

EXAMPLE 4

Compound: (I)–17-butyrate 100 mg. (I) are stirred in 1 ml. butyric anhydride with 50 mg. p-toluene-sulfonic acid for 3 days at 37° C. After preparation, as described in Example 2, and recrystallization from isopropyl ether, there is obtained 95 mg. (I)-17-butyrate with a melting point of 173.5–174° C. UV: epsilon–282=16,800.

EXAMPLE 5

100 mg. (I) are stirred in 1 ml. capronic anhydride with 50 mg. p-toluene-sulfonic acid for 4 days at 37° C. After preparation, as described in Example 2, there were obtained (I)-17-capronate as an oil. UV: epsilon–282=17,000.

EXAMPLE 6

500 mg. 21 - fluoro - 6,7 beta-oxido-1,2α-methylene-delta[4]-pregnene - 17α - ol - 3,20-dione-17-acetate (melting point 225–228° C.) are dissolved in 25 ml. glacial acetic acid. The solution is saturated at room temperature with hydrogen chloride gas and left standing for 16 hours at room temperature. After precipitation with ice water, the precipitate is filtered and taken up in methylene chloride. The organic phase is washed neutral with sodium-hydrogen carbonate solution and water, dried and evaporated to dryness in the vacuum. The cured 6-chloro-21-fluoro - 1α - chloromethyl - delta[4,6]-pregnadiene-17α-ol-3,20-dione 17-acetate thus obtained is taken up in 20 ml. collidine and heated to a boil for 20 minutes under nitrogen. After dilution with ether, the product is then washed with dilute hydrochloric acid, sodium-hydrogen carbonate solution and water, dried over sodium sulfate and evaporated to dryness in the vacuum. The residue is chromatographed on silica gel. With 11–15% acetone/pentane, there is obtained, after recrystallization from acetic ester, 289 mg. (I)-17-acetate.

EXAMPLE 7

300 mg. 21 - fluoro - 6,7α - oxido-1,2α-methylene-delta[4] - pregnene - 17α - ol - 3,20 - dione - 17-propionate, melting point 240–243° C., are dissolved in 15 ml. glacial acetic acid. The solution is saturated with hydrogen chloride gas and left standing for 20 hours at room temperature. After precipitation with ice water, the precipitate is filtered, dissolved in methylene chloride; then the resultant solution is washed with sodium hydrogen carbonate solution and water, dried over sodium sulfate and the solvent is evaporated in the vacuum. The crude 6-chloro-21-fluoro-1α-chloromethyl-delta[4,6]-pregnadiene - 17α - ol-3,20 - dione - 17 - propionate is dissolved in 10 ml. benzene and stirred for 24 hours with 4.0 g. aluminum oxide of the activity stage basic II under nitrogen. After suction from the aluminum oxide, the solution is washed with acetone-methylene chloride, the filtrate is concentrated in the vacuum and the crude product purified by means of preparative layer chromatography. Yield: 173 mg. (I)-17-propionate.

EXAMPLE 8

100 mg. 21 - fluoro - 6,7α-oxido-1,2α-methylene-delta[4]-pregnene - 17α - ol - 3,20 - dione - 17-butyrate are converted under the conditions indicated in Example 6 to (I)-butyrate. Yield: 43 mg.

EXAMPLE 9

100 mg. 21 - fluoro - 6,7-beta-oxido-1,2α-methylene-delta[4] - pregnene - 17α - ol - 3,20-dione-17-capronate are converted under the conditions described in Example 7 to (I)-17-capronate. Yield: 57 mg.

What is claimed is:

1. The method for the production of 21-fluoro-delta$^{4,6}$-pregnadienes of the general formula:

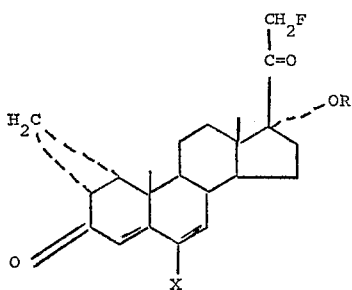

wherein X is selected from the group consisting of fluorine and chlorine and R is acyl radical of a physiologically tolerable aliphatic carboxylic acid having up to 16 carbon atoms, comprising:
(a) reacting an ester of a 21-fluoro-6,7-oxido-1,2α-methylene-delta$^4$-pregnene - 17α - ol - 3,20 - dione in an organic acid with hydrochloric acid forming the 6 - chloro-delta$^6$ group and opening the 1,2-methylene linkage forming the 1-chloro-methyl group;
(b) removing the resultant water formed in step (a) by means of a strong acid, thereby creating a 6x-delta$^6$ configuration and forming a 4,6-double bond;
(c) effecting reclosure of the 1,2α-methylene ring opened in steps (a) and (b) by the action of a reagent selected from the group consisting of an organic base and aluminum oxide, to form a 6-halo-21-fluoro-1,2α-methylene-delta$^{4,6}$-pregnadiene - 17α-ol - 3,20-dione ester.

2. A method according to claim 1 in which the epoxide opening and the water separation are effected with hydrochloric acid in acetic acid in one operation.

References Cited

UNITED STATES PATENTS 3,027,386  3/1962  Bergstrom et al. __ 260—397.47
3,365,446  1/1968  Cross et al. _____ 260—239.55

OTHER REFERENCES

Ringold et al., "J.A.C.S.," vol. 80 (1958), p. 250 relied on.

ELBERT L. ROBERTS, Primary Examiner

U.S. Cl. X.R.
260—239.55, 397.4

3,644,441
METHOD FOR THE PRODUCTION OF 21-FLUORO-4,6-PREGNADIENES

Rudolf Wiechert, Friedmund Neumann, and Henry Laurent, Berlin, Germany, assignors to Schering AG, Berlin and Bergkamen, Germany
No Drawing. Continuation of application Ser. No. 659,000, Aug. 8, 1967. This application Nov. 17, 1969, Ser. No. 871,613
Int. Cl. C07c *167/28*
U.S. Cl. 260—397.47     2 Claims The present invention relates to methods for the production of 21-fluoro-delta$^{4,6}$-pregnadienes of the general formula:

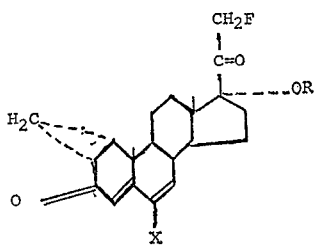

wherein X denotes a fluorine or chlorine atom and R the radical of a physiologically tolerable acid.

This application is a continuation of applicants' earlier filed application Ser. No. 659,000 filed Aug. 8, 1967 and now abandoned.

21-fluoro-delta$^{4,6}$-pregnadienes are produced by esterifying the corresponding 6-halogen-21-fluoro-1,2,$\alpha$-methylene delta$^{4,6}$ pregnadiene-17$\alpha$-ol-3,20-dione, or treating the ester of a 21-fluoro-6,7-oxido-1,2-$\alpha$-methylene delta$^4$ pregnene 17$\alpha$-ol-3,20-dione with an acid HX wherein X denotes a fluorine or chlorine atom.

The production of the compounds is effected by (a) either esterifying the corresponding 6-halogen-21-fluoro-1,2,$\alpha$-methylene delta$^{4,6}$ pregnadiene-17$\alpha$-ol-3,20-dione, or (b) by treating the ester of a 21-fluoro-6,7-oxido-1,2,$\alpha$-methylene-delta$^4$-pregnene-17-$\alpha$-ol-3,20-dione with an acid HX, where X has the above mentioned meaning, separating water with a strong acid, preferably hydrochloric acid or sulfuric acid, and as far as the 1,2,$\alpha$-methylene ring is opened at the same time, forming the latter back by the action of an organic base, such as collidine, lutidine, pyridine or of aluminum oxide.

As acid radicals, there can be used those of physiologically tolerable acids.

Preferred acids are those with up to 15 carbon atoms, particularly low and medium aliphatic carboxylic acids; furthermore, the acids can also be substituted unsaturated, branched, polybasic or substituted in usual manner, for example, by hydroxy- or amino-groups or halogen atoms. Suitable are also cycloaliphatic, aromatic, mixed aromatic-cycloaliphatic or heterocyclic acids, which can likewise be substituted in suitable manner. Common inorganic acids, such as sulfuric acid and phosphoric acid can also be used.

The esterification according to (a) above can be effected according to known methods, such as the reaction with acid anhydrides in the presence of an acid, the reaction according to Schotten-Bauman or the reaction with the desired acid in the presence of trifluoroacetic anhydride.

The reaction of a 6,7 epoxide, with the acid HX according to (b) takes place in the usual manner.

Depending on the meaning of X in the end product, the 6,7 expoxide is reacted with hydrochloric or hydrofluoric acid in the presence of an inert solvent at a higher or lower reaction temperature, preferably at about —60 to +50° C., particularly at room temperature. Inert solvents that can be used are, for example, carboxylic acids, such as acetic acid, hydrocarbons, like hexane, chlorinated hydrocarbon, like methylene chloride and chloroform, or ethers, like dioxane and tetrahydrofurane. A particularly suitable solvent for opening the epoxide with hydrofluoric acid is dimethyl formamide. The originally obtained 6,7-halohydrines are treated with a strong acid, such as hydrochloric acid in acetic acid, in order to separate the water, with formation of the 6-halogen delta$^6$-grouping. If a 6-chloro-delta$^6$-grouping is introduced, epoxide opening and water separation with hydrochloric acid can also be preferably effected in one step.

In the reaction with hydrochloric acid, the acid can also be added on the 1,2$\alpha$-methylene group with formation of the corresponding 1$\alpha$-chloromethyl compound. For the reformation of the cyclopropane ring, the primary product thus obtained is subsequently treated with an organic base, such as collidine, lutidine, pyridine, etc.

The reformation of the cyclopropane ring is effected preferably at the boiling temperature of the base used. The desired ring closure to the 1,2$\alpha$-methylene compound can also be effected, however, by merely filtering the 1-chloromethyl compound dissolved in an organic solvent over aluminum oxide, in which case the application of higher temperatures is unnecessary.

The new esters show a surprisingly gestagenic effect, particularly after oral administration. Table I shows the superiority of the new compounds by means of the example of 6-chloro-21-fluoro-1,2$\alpha$-methylene-delta$^{4,6}$-pregnadiene-17$\alpha$-ol-3,20-dione-17-acetate, known herein as I, and 6-chloro-1,2 $\alpha$-methylene-delta$^{4,6}$-pregnadiene-17$\alpha$-ol-3,20-dione-17-acetate, herein known as II.

The gestagenic effect was checked in the usual Clauberg test.

A special advantage of the new esters is, furthermore, that they show practically no antiandrogenic effect (Table I), which is a highly annoying side effect of many gestagens.

The anti-androgenic effect was tested on male castrated rats weighing about 100 g. Starting 1 week after castration, the test substance was administered in stepped-up doses over 7 days. Over the same period, the animals received daily 0.1 mg. testosterone propionate s.c. The animals were sacrificed on the eighth day and the weight of the gonecysts and prostate was determined. As ED/50 was determined, the daily dose that reduces by half the weight of the organ effected by testosterone propionate alone.

TABLE I

| Substance | Gestagenic effect threshold value | Antiandrogenic effect | |
|---|---|---|---|
| | | ED/50 genocyst | ED/50 prostate |
| I-17 acetate | 1-3 gamma | 1 mg | 1 mg. |
| II-17 acetate | 10 gamma | 0.25 mg | 0.22 mg. |

The main field of application of the active substances according to the invention is the treatment of the following gynecological disorders: primary amenorrhea and secondary amenorrhea of longer duration, cyclical disorders with insufficient corpus luteum function, endometriosis, hypoplasia of the uterus, premenstrual complaints and mastopathy.

The doses are adapted to meet the gravity of the disease. In general, 5–100 mg. active substance are administered daily.

The production of the pharmaceutical specialties is effected as usual by mixing the active substances with suitable additives, vehicles and taste corrigents. They are particularly suitable for oral administration by means of tablets, dragées, capsules and solutions.

The following preparations of the new active substances are preferred:

(1) Gelatin capsule of 5 mg. each

Composition for 1 capsule

| | Mg. |
|---|---|
| I-17-acetate, micronized (particulate size 2–8 m$\mu$, occasionally 16 m$\mu$) | 5 |
| Lactose DAB 6 | 200 |
| | 205 |

The substance is filled as usual into hard gelatin capsules.

(2) Tablets at 15 mg.

Composition for 1 tablet

| | Mg. |
|---|---|
| I-17-acetate micro, particle size 2–8 m$\mu$, occasionally 16 m$\mu$ | 15,000 |
| Lactose DAB 6, USP XVI | 24,000 |
| Corn starch USP XVI | 45,065 |
| Talcum DAB 6, USP XVI | 4,000 |
| Gelatin, white, DAB 6 | 1,400 |
| Sodium lauryl sulfate USP XVI | 0.500 |
| p-Oxybenzoic methyl ester, DAB 6, 3rd suppl. USP XVI | 0.024 |
| p-Oxybenzoic propyl ester, DAB 6, 3rd suppl. USP XVI | 0.011 |

The tablets are made in the usual manner on a tablet press. They have the following average characteristics: diameter=6 mm. with breaking line, height 2.6–3.7 mm.; hardness: about 4 kg. on the Stokes hardness tester; disintegration in water at 20° C., about 30 seconds.

(3) Preparations applicable as drops 1 ml.–2 mg. (1 ml.=30–35 drops)

Composition for 100 ml.

| | | |
|---|---|---|
| I-17-acetate | mg | 200 |
| Ethyl alcohol | ml | 20 |
| Propylene glycol | ml | 25 |
| Bidistilled water | ml | 100 |

Production of the starting materials (A) The new Compound (I) 6-chloro-21-fluoro-1,2 $\alpha$-methylene-delta$^{4,6}$-pregnadiene-17$\alpha$-3,20 dione can be prepared as follows: 20.0 of Compound (II) 6-chloro-1,2$\alpha$ - methylene - delta$^{4,6}$-pregnadiene-17$\alpha$-ol-3,20-dione (prepared according to German Pat. 1,189,991) and 1.07 g. $\alpha$-azo-bis-isobutyronitrile are dissolved in 250 ml. absolute tetrahydrofurane and 250 ml. absolute methanol. Then 37 g. calcium-oxide are mixed in and added in drops under stirring to ⅓ of an iodine solution produced from 30.9 g. iodine, 100 ml. absolute tetrahydrofurane and 100 ml. absolute methanol. After 30 minutes, the remaining ⅔ of the iodine solution are added and 18.5 g. calcium oxide admixed twice in intervals of 30 minutes. After a total reaction time of 4 hours, the calcium oxide is separated and washed out thoroughly with methylene chloride. The organic phase is washed with sodium-thiosulfate solution and water, dried over sodium sulfate and evaporated in the vacuum to dryness. The crude 6-chloro - 21-iodo-1,2$\alpha$-methylene-delta$^{4,6}$-pregnadiene-17$\alpha$-ol-3,20 dione is dissolved in 500 ml. acetone, mixed with 143 ml. triethylamine and 93 ml. glacial acetic acid and heated for 2 hours under reflux, then stored for 2 hours at room temperature. Subsequently, the product is stirred into ice water and the precipitate sucked off, taken up in methylene chloride and dried over sodium sulfate. The residue remaining after evaporation to dryness is chromatographed on silica gel, and 15.5 g. II/21 acetate are obtained as oil.

These are dissolved in 150 ml. methylene chloride and 150 ml. methanol, mixed at 0–5° C. with a solution of 1.65 g. potassium hydroxide in 60 ml. methanol and stirred for 8 minutes. After neutralization with glacial acetic acid, the product is diluted with methylene chloride, washed with water and dried over sodium sulfate. The residue remaining after evaporation to dryness is recrystallized from acetic ethyl ester, and 9.8 g. 6-chloro-1,2$\alpha$ - methylene - delta$^{4,6}$ - pregnadiene-17$\alpha$-21-diol-3,20-dione with a melting point of 230.5 to 233.5° (decomposition) are obtained. UV: epsilon-282=17,000.

5.0 g. of the compound thus obtained are dissolved in 100 ml. absolute pyridine, mixed under stirring with a solution of 4 ml. methane sulfochloride in 10 ml. chloroform and stirred again for 3 hours. Subsequently, the excess acid chloride is decomposed with ice water. The solution is diluted with chloroform, washed with diluted hydrochloric acid and water and dried over sodium sulfate. After evaporation to dryness and grinding with diisopropyl ether, we obtain 5.25 g. 6-chloro-1,2-$\alpha$-methylene - delta$^{4,6}$ - pregnadiene - 17$\alpha$,21-diol-3,20-dione-21-mesylate with a melting point of 173 to 175° C. (decomposition). These are stirred in 275 ml. dimethyl formamide with 8.29 g. potassium hydrogen-fluoride for 18 hours at 110° C. The product is stirred into ice water, extracted with methylene chloride, washed with water, dried over sodium sulfate and evaporated in the vacuum to dryness. The remaining residue is chromatographed on silica gel, and there is obtained 2.1 g. 6-chloro-21-fluoro-1,2$\alpha$ - methylene - delta$^{4,6}$ - pregnadiene - 17$\alpha$ - ol - 3,20-dione with a melting point of 249.5 to 253° C. UV: epsilon-282=17,300.

(B) The 6,7 epoxides heretofore not described in the literature can be prepared as follows:

(a) 30.0 g. 1,2$\alpha$ - methylene-delta$^{4,\beta}$-pregnadiene-17$\alpha$-ol-3,20-dione and 1.6 g. $\alpha,\alpha'$-azo-bis-isobutyronitrile are dissolved in 375 ml. absolute tetrahydrofurane and 275 ml. absolute methanol. Then 55 g. calcium oxide are added and the product is added in drops under stirring to ⅓ of an iodine solution, prepared from 46 g. iodine, 150 ml. absolute tetrahydrofurane and 150 ml. absolute methanol. After 30 minutes, the remaining ⅔ of the iodine solution are added and 28 g. calcium oxide are admixed twice in intervals of 30 minutes. After a total reaction time of 4 hours, the calcium oxide is separated and washed out thoroughly with sodium thiosulfate solution, dried over sodium sulfate and evaporated in the vaccuum to dryness. The crude 21-iodo-1,2$\alpha$-methylene-delta$^{4,6}$-pregnadiene-17$\alpha$-ol-3,20-dione is dissolved in 750 ml. acetone, mixed with 215 ml. triethylamine and 140 ml. glacial acetic acid and heated for 2 hours under reflux, then stored for 2 hours at room temperature. Subsequently, the product is stirred into ice water, taken up in methylene chloride and dried over sodium sulfate, the remaining residue after evaporation to dryness is chromatographed on silica gel, and 22 g. 1,2$\alpha$-methylene-delta$^{4,6}$-pregnadiene 17$\alpha$-21-diol-3,20-dione-21-acetate are obtained as an oil. These are dissolved in 225 ml. methylene chloride and 225 ml. methanol, mixed at 0–5° C. with a solution of 2.5 g. potassium hydroxide in 90 ml. methanol and stirred for 80 minutes. After neutralization with glacial acetic acid, the product is diluted with methylene chloride, washed with water and dried over sodium sulfate.

7.5 g. of the 1,2$\alpha$-methylene-delta$^{4,6}$-pregnadiene-17$\alpha$, 21-diol-3,20-dione thus obtained are dissolved in 150 ml. absolute pyridine, mixed under stirring and ice cooling with a solution of 6 ml. methane sulfochloride in 15 ml. chloroform and stirred again for 3 hours. The solution is diluted with chloroform, washed with diluted hydrochloric acid and water and dried over sodium sulfate. After evaporation to dryness, we obtain 7.1 g. 1,2$\alpha$-methylene-delta$^{4,6}$-pregnadiene - 17$\alpha$,21 - diol-3,20-dione-21 mesylate. These are stirred in 1400 ml. dimethyl formamide with 12 g. potassium hydrogen fluoride for 18 hours at 110° C. The product is stirred into ice water, extracted with methylene chloride, washed with water, dried over sodium sulfate and evaporated in the vacuum